United States Patent
Brandl

(10) Patent No.: US 9,646,185 B2
(45) Date of Patent: May 9, 2017

(54) SYSTEM AND METHOD FOR MANAGING RFID TAGS

(75) Inventor: Roland Brandl, Eggersdorf bei Graz (AT)

(73) Assignee: NXP B.V., Eindhoven (NL)

( * ) Notice: Subject to any disclaimer, the term of this patent is extended or adjusted under 35 U.S.C. 154(b) by 501 days.

(21) Appl. No.: 13/360,866

(22) Filed: Jan. 30, 2012

(65) Prior Publication Data

US 2013/0194074 A1    Aug. 1, 2013

(51) Int. Cl.
*H04Q 5/22* (2006.01)
*G06K 7/10* (2006.01)
*G06K 19/07* (2006.01)

(52) U.S. Cl.
CPC ..... *G06K 7/10297* (2013.01); *G06K 19/0723* (2013.01)

(58) Field of Classification Search
USPC ........................................ 340/10.1
See application file for complete search history.

(56) References Cited

U.S. PATENT DOCUMENTS

| | | | | |
|---|---|---|---|---|
| 6,223,260 B1 * | 4/2001 | Gujral | ............... | G06F 12/0811 711/119 |
| 7,336,516 B2 * | 2/2008 | Tran | ............... | G11C 11/5642 365/185.33 |
| RE43,254 E * | 3/2012 | Wood, Jr. | ............. | G06F 13/4027 370/329 |
| 8,400,275 B2 * | 3/2013 | Huang | ............... | 340/10.33 |
| 2005/0264401 A1 | 12/2005 | Haller et al. | | |
| 2006/0255131 A1 * | 11/2006 | Stewart | ............... | 235/383 |
| 2009/0146791 A1 | 6/2009 | Jantunen et al. | | |
| 2009/0193199 A1 * | 7/2009 | Averill | ............... | G06F 12/0817 711/144 |
| 2010/0019883 A1 * | 1/2010 | Eom et al. | ............... | 340/10.1 |
| 2010/0052869 A1 | 3/2010 | Stewart | | |
| 2010/0060432 A1 * | 3/2010 | van Niekerk et al. | ........ | 340/10.3 |
| 2010/0090809 A1 * | 4/2010 | Yeo et al. | ............... | 340/10.41 |
| 2010/0207739 A1 * | 8/2010 | Smith et al. | ............... | 340/10.4 |
| 2010/0308972 A1 * | 12/2010 | Kim et al. | ............... | 340/10.1 |
| 2011/0199186 A1 * | 8/2011 | Han et al. | ............... | 340/10.1 |
| 2013/0015958 A1 * | 1/2013 | Schuessler et al. | ......... | 340/10.3 |

FOREIGN PATENT DOCUMENTS

TW    201023050 A    6/2010

OTHER PUBLICATIONS

EPCglobal—Version 1.2.0—Oct. 23, 2008.*

(Continued)

*Primary Examiner* — Quang D Pham

(57) ABSTRACT

A system for managing a population of RFID tags where the system may include: an interrogator configured to transmit a select command to the population of RFID tags, and at least one modified tag in the population of RFID tags. The select command may include information specifying a memory location. The modified tag may include a memory configured with a memory address corresponding to the memory location specified by the select command, and a controller configured to perform at least one action upon the at least one modified tag receiving the select command. The at least one action may be based on the memory location specified by the select command.

15 Claims, 7 Drawing Sheets

(56) References Cited

OTHER PUBLICATIONS

Extended European Search Report for Patent Appln. No. 12199408.1 (May 23, 2013).
Specification for RFID Air Interface, EPC Radio-Frequency Identity Protocols Class-1 Generation-2 UHF RFID Protocol for Communications at 860 MHz-960 MHz Version 1.2.0. 2004-2008 EPCglobal Inc., pp. 1-108, Oct. 23, 2008.
Chinese Patent for Chinese Patent Application No. 201310031345.9 dated Aug. 10, 2016.

* cited by examiner

| VALUES | COMMAND | TARGET | ACTION | MemBank | POINTER | LENGTH | MASK | TRUNCATE | CRC-16 |
|---|---|---|---|---|---|---|---|---|---|
| | 1010 | 100 | 000 | 01 | 10000010000000000 | 00000001 | 1 | 0 | 1011000110011010 |

700

702 — MemBank
704 — POINTER
706 — LENGTH

FIG. 7

SYSTEM AND METHOD FOR MANAGING RFID TAGS

BACKGROUND

Radio-frequency identification (RFID) is a technology that uses radio waves to transfer data between a tag and an interrogator. The tag may be attached to an object. Data transferred from the tag may be used for identifying and tracking the object. The tag and interrogator may be used to track and identify, for example, inventory, assets, people, animals, etc.

SUMMARY

A brief summary in accordance with the invention is presented. Various exemplary embodiments in accordance with the invention relate to systems and methods for managing RFID tags. At least one RFID tag may receive a select command from an interrogator. The at least one RFID tag may perform at least one action based on information included in the select command.

BRIEF DESCRIPTION OF THE DRAWINGS

In order to better understand various exemplary embodiments, reference is made to the accompanying drawings, wherein:

FIG. 7 is a table that illustrates an example of a modified Select command.

DETAILED DESCRIPTION

Figure 1:
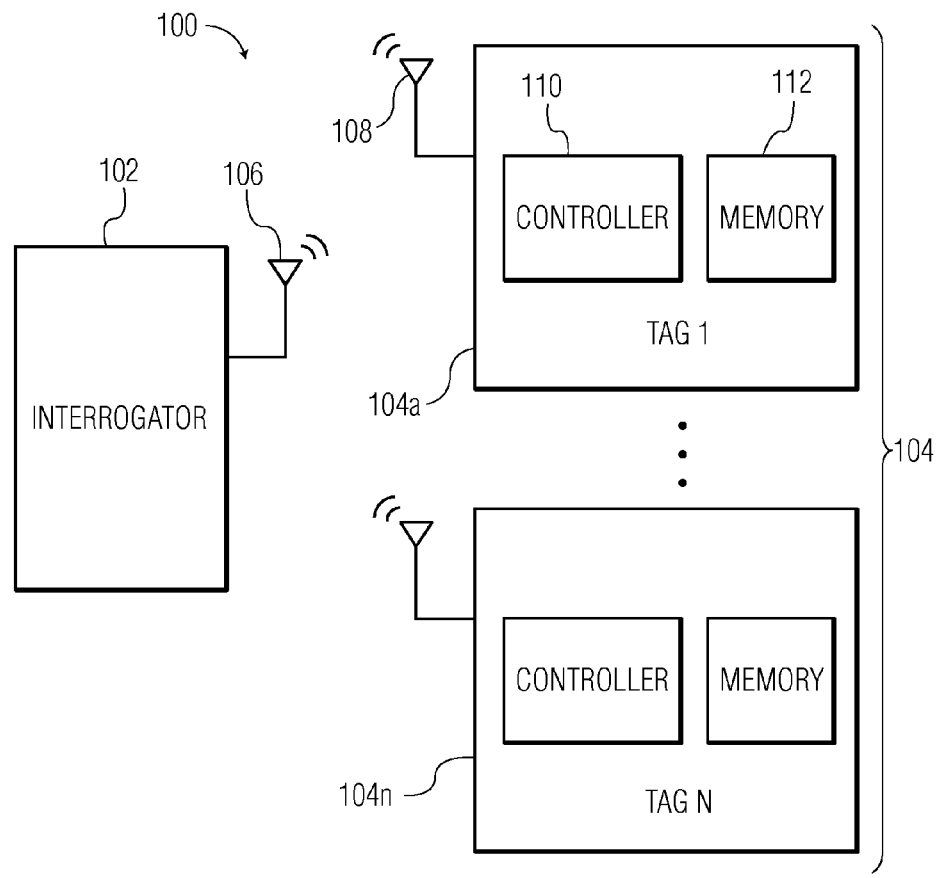
FIG. 1 illustrates a radio frequency identification (RFID) system.

Various exemplary embodiments in accordance with the invention relate to a system for managing a population of RFID tags, including: an interrogator configured to transmit a select command to the population of RFID tags, wherein the select command includes information specifying a memory location; and at least one modified tag in the population of RFID tags, wherein the at least one modified tag includes: a memory configured with a memory address corresponding to the memory location specified by the select command; and a controller configured to perform at least one action upon the at least one modified tag receiving the select command, wherein the at least one action is based on the memory location specified by the select command.

In some embodiments, the at least one action performed by the controller is configuring the at least one modified tag to modify its backscatter strength. In some embodiments, the at least one action performed by the controller is configuring the at least one modified tag to modify its reply to an ACK command. In some embodiments, the memory location specified by the select command corresponds to a non-existing memory address. In some embodiments, the select command further includes verification information, and wherein the controller is configured to verify the at least one action with the verification information.

Various exemplary embodiments in accordance with the invention further relate to a RFID tag, including: an antenna configured to receive a select command from an interrogator, wherein the select command includes information specifying a memory location; a memory configured with a memory address corresponding to the memory location specified by the select command; and a controller configured to perform at least one action upon the reception of the select command, wherein the at least one action is based on the memory location specified by the select command.

In some embodiments, the at least one action performed by the controller is configuring the at least one modified tag to modify its backscatter strength. In some embodiments, the at least one action performed by the controller is configuring the RFID tag to modify its reply to an ACK command. In some embodiments, the memory location specified by the select command corresponds to a non-existing memory address. In some embodiments, the select command further includes verification information, and wherein the controller is configured to verify the at least one action with the verification information.

Various exemplary embodiments in accordance with the invention further relate to a method for managing a RFID tag, including: receiving a select command from an interrogator, wherein the select command includes information specifying a memory location; identifying a memory address of the RFID tag that corresponds to the memory location specified by the select command; and performing at least one action based on the memory location specified by the select command.

In some embodiments, performing the at least one action includes configuring the RFID tag to modify its backscatter strength based on the memory location specified by the select command. In some embodiments, performing the at least one action includes configuring the RFID tag to modify its reply to an ACK command based on the memory location specified by the select command. In some embodiments, the memory location specified by the select command corresponds to a non-existing memory address. In some embodiments, the method further includes verifying the at least one action with verification information, wherein the select command further includes the verification information. In some embodiments, the method further includes receiving a pre-select command from the interrogator prior to receiving the select command, wherein the pre-select command includes information instructing the RFID tag to receive the select command.

Various exemplary embodiments further relate to a method for managing a population of RFID tags, including: transmitting a select command to the population of RFID tags, wherein the select command includes information specifying a memory location; identifying a memory address of at least one tag in the population of RFID tags that corresponds to the memory location specified by the select command; and performing at least one action based on the memory location specified by the select command.

In some embodiments, the memory location specified by the select command corresponds to a non-existing memory address. In some embodiments, the method further includes transmitting a pre-select command to the population of RFID tags prior to transmitting the select command, wherein the pre-select command includes information instructing which RFID tags will participate in the select command.

Referring now to the drawings, in which like numerals refer to like components or steps, there are disclosed broad aspects of various exemplary embodiments.

FIG. 1 illustrates a radio frequency identification (RFID) system 100. The RFID system may include an interrogator 102 and a population of tags 104. The population of tags 104 may include one or more individual tags 104a-104n. The interrogator 102 may communicate with the population of tags 104 via an interrogator antenna 106. Each tag 104a-104n may include a tag antenna 108, a controller 110, and a memory 112. Each tag 104a-104n may communicate with the interrogator 102 via its respective tag antenna 108. The memory 112 may be divided into separate memory banks such as, for example, an electronic product code (EPC) memory, a tag identification (TID) memory, user memory, and reserved memory.

The interrogator 102 may transmit information to one or more of the tags 104n-104n by transmitting a modulated radio frequency (RF) signal over the interrogator antenna 106. The RF signal may also supply operating energy to the tag population 104. The interrogator 102 may receive information from one of the tags 104a-104n in the population of tags 104 by transmitting a continuous-wave (CW) RF signal to the population of tags 104. One of the tags 104a-104n in the population of tags 104 may respond by modulating a reflection coefficient of its respective tag antenna 108, thereby backscattering an information signal to the interrogator 102.

In a conventional implementation, the interrogator 102 may manage the population of tags 104 by using three basic operations: SELECT, INVENTORY, and ACCESS. The conventional implementation of these operations is disclosed in "EPC Radio-Frequency Identity Protocols Class-1 Generation-2 UHF RFID Protocol for Communications at 860 Mhz-960 MHz," Version 1.2.0, EPCglobal Inc., October 2008, and is hereby incorporated by reference.

The conventional SELECT operation may select one or more tags 104a-104n in the tag population 104 to participate in one or more subsequent INVENTORY and ACCESS operations. The conventional SELECT operation may be applied successively to select the particular tags based on user-specified criteria. The selected tags may include a single tag from the population of tags 104, all tags in the population of tags 104, or a subgroup of tags in the population of tags 104.

The INVENTORY operation may identify a single tag (e.g., tag 104a) in the population of tags 104. The INVENTORY operation may include multiple commands. The interrogator 102 may begin the INVENTORY operation by transmitting a Query command in one of at least four sessions. One or more tags 104a-104n may reply to the Query command. The interrogator 102 may detect the reply from only a single tag (e.g., tag 104a) and may request information from the memory 112 of the tag. The INVENTORY operation may operate in only one session at a time.

The ACCESS operation may read from and/or write to the tag identified in the INVENTORY operation. In conventional implementations, the tag must be uniquely identified with the INVENTORY operation for the ACCESS operation to be successful. The ACCESS operation may include multiple commands, some of which may employ one-time-pad based cover-coding of the interrogator-to-tag link.

Figure 2:
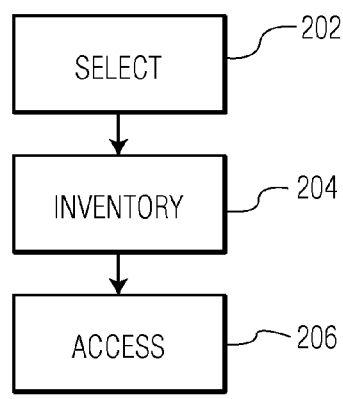
FIG. 2 illustrates an embodiment of a sequence of conventional tag management operations.

FIG. 2 illustrates an embodiment of a sequence of conventional tag management operations. Conventional tag management may begin with a conventional SELECT operation 202. The conventional SELECT operation 202 may select one or more tags 104a-104n in the tag population 104 to participate one or more subsequent operations. After the SELECT operation 202, a single tag may be identified from the population of tags 104 with the INVENTORY operation 204. Alternatively, in circumstances where particular tags in the tag population 104 do not need to be selected, the conventional SELECT operation 202 may be omitted and the INVENTORY operation 204 may be the first operation. Following the INVENTORY operation 204, an ACCESS operation 206 may be performed. The ACCESS operation 206 may read from and/or write to the tag identified in the INVENTORY operation 204. The conventional tag management operations may not allow features of a tag that do not fall within the SELECT or INVENTORY operations to be controlled or modified.

Figure 3:
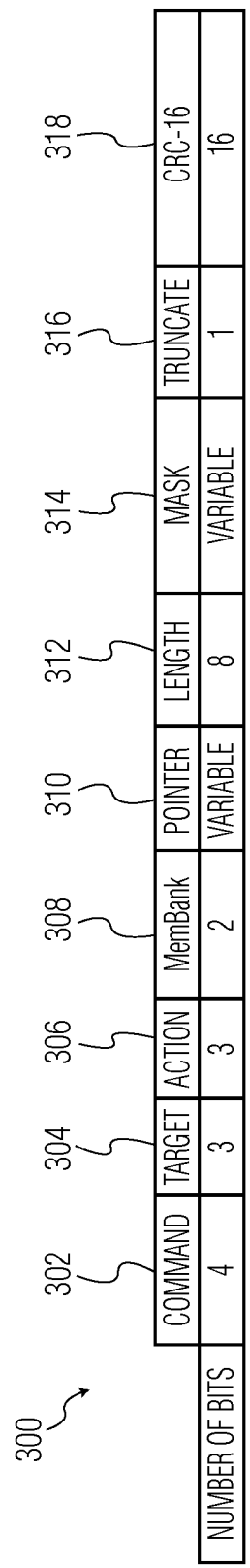
FIG. 3 is a table that illustrates an embodiment of a structure of a Select command.

FIG. 3 is a table that illustrates an embodiment of a structure of a Select command 300. The SELECT operation 202 may include a single Select command 300. The Select command 300 may be transmitted by an interrogator 102 to a population of tags 104. The Select command may include a Command field 302, a Target field 304, an Action field 306, a MemBank field 308, a Pointer field 310, a Length field 312, a Mask field 314, a Truncate field 316, and a CRC-16 field 318. The Command field 302 may identify the command as a Select command. The Target field 304 may indicate whether a tag is to be selected and/or inventoried. The Action field 306 may instruct a tag what action to take if it is selected and/or inventoried. The MemBank field 308 may specify what section of the tag's memory 112 is to be addressed. The sections the MemBank field 308 may specify include, for example, the EPC memory, the TID memory, and the user memory. The Pointer field 310 and the Length field 312 may describe a memory location in the section of memory specified by the MemBank field 308. The Mask field 314 may contain a bit string that the tag compares against data in the tag's memory that begins at the Pointer field 310 location and ends however many bits later the Length field 312 specifies. The number of bits in the Mask field 314 may be specified by the Length field 312. The Truncate field 316 may instruct the tag to truncate a reply to a later ACK command from the interrogator 102. The CRC-16 field 318 may include error control information for detecting and correcting errors in the transmission of the Select command 300. In conventional implementations, the tag may not transmit any reply to the Select command 300.

Figure 4:
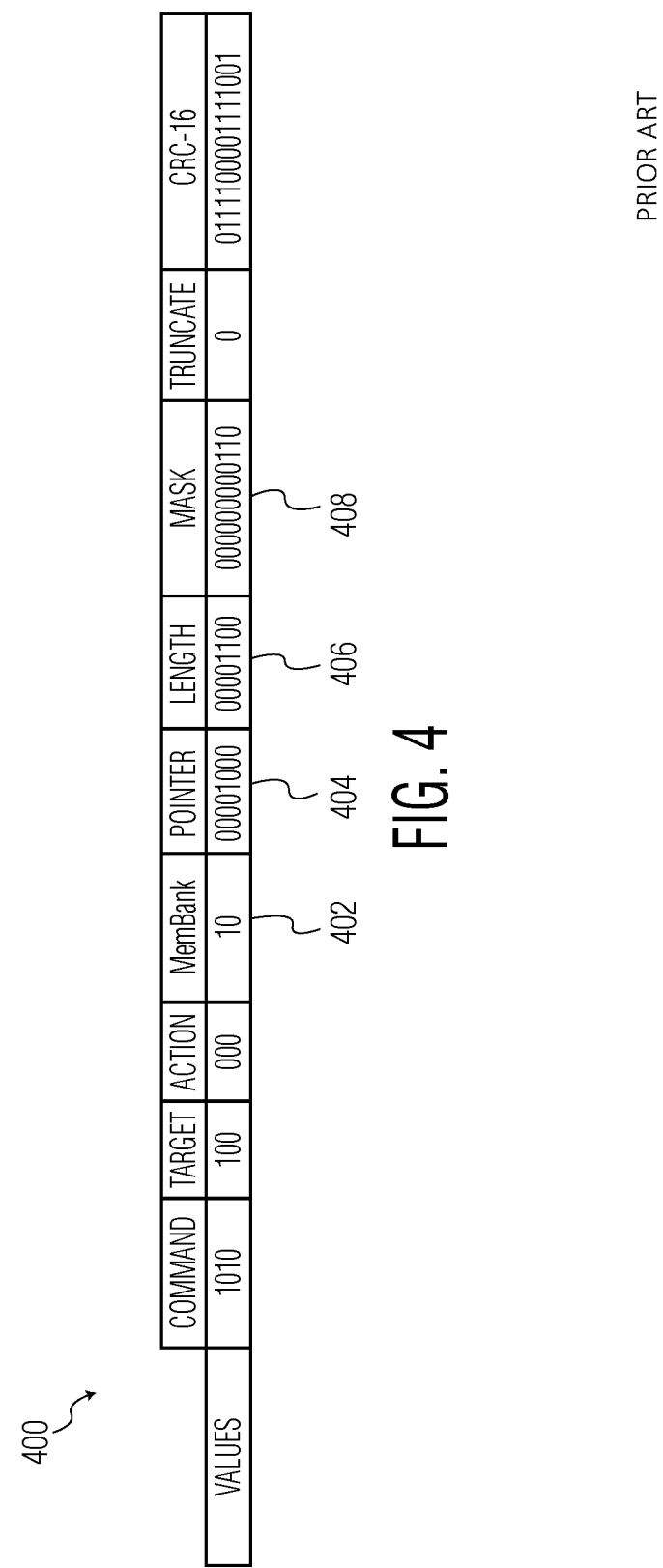
FIG. 4 is a table that illustrates an example of a conventional Select command.

FIG. 4 is a table that illustrates an example of a conventional Select command 400. The values in the MemBank field 402, Pointer field 404, and Length field 406 may specify a memory location in a tag with data corresponding to a manufacturer code. If the data stored in the tag at that memory location matches the value in the Mask field 408, then the tag may be selected for one or more subsequent operations. In this way, all tags from a specific manufacturer may be selected to participate in a subsequent INVENTORY operation.

Figure 5:
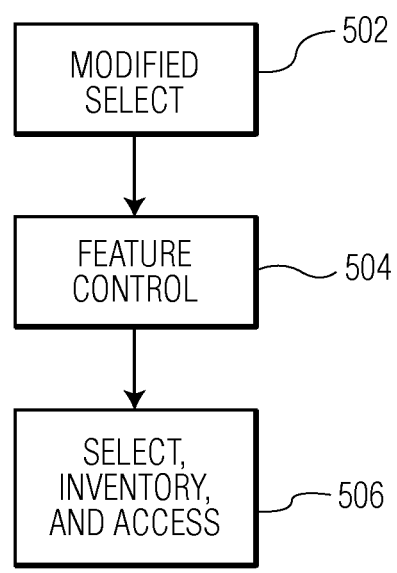
FIG. 5 illustrates an embodiment of a modified sequence of tag management operations.

FIG. 5 illustrates an embodiment of a modified sequence of tag management operations. The modified tag management may begin with a modified SELECT operation 502. Based upon information received in the modified SELECT operation 502, one or more of the tags 104a-104n may control or modify tag features in a Feature Control step 504. After one or more of the tags 104a-104n perform the Feature Control step 504, the interrogator 102 may proceed with conventional SELECT, INVENTORY, and ACCESS operations 506. Alternatively, the interrogator 102 may proceed with one or more additional modified SELECT operations. The controller 110 and memory 112 of one or more tags 104a-104n may be configured to support the modified SELECT operation 502 and the Feature Control step 504.

The modified SELECT operation may use the Select command 300 as illustrated in FIG. 3. In the modified SELECT operation, the MemBank field 308, Pointer field 310, and Length field 312 may specify a special memory location in the tag's memory 112 that is not typically used by conventional tags, or that does not correspond to an existing memory address. The controller 110 in the tag may be configured to perform one or more specific actions if a Select command is received that specifies the special memory location. One or more of the actions may be performed during the Feature Control step 504 illustrated in FIG. 5.

Figure 6:
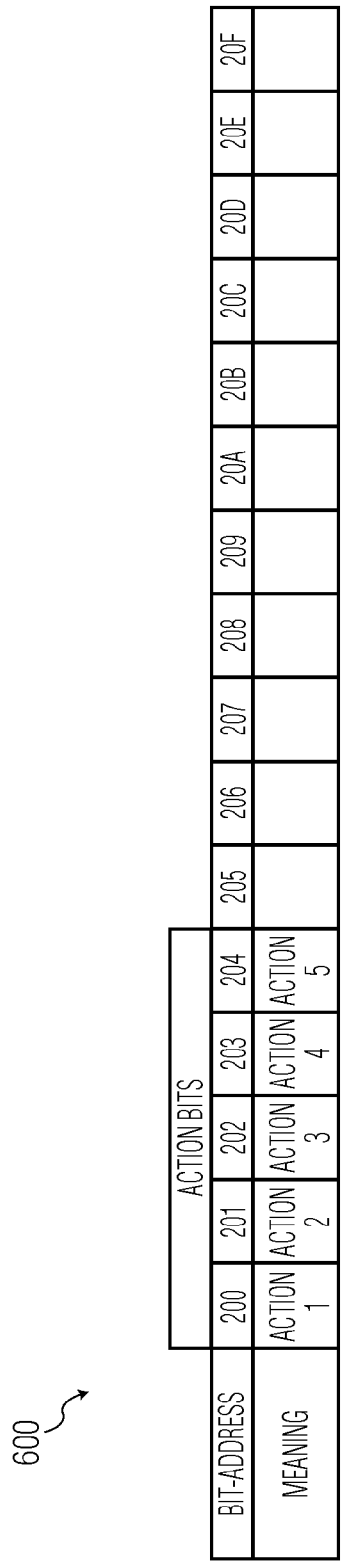
FIG. 6 is a table that illustrates an embodiment of a special memory location.

FIG. 6 is a table that illustrates an embodiment of a special memory location 600. Specific bit addresses of the special memory location 600 may be assigned specific actions. The actions may be any function or feature supported by the tag controller 110. If the MemBank field 308, Pointer field 310, and Length field 312 of the Select command 300 specify one or more bit addresses that have corresponding actions, then the controller 110 may carry out one or more of the actions. Alternatively, additional parameters may need to be met for the controller 110 to carry out one or more of the actions. For example, the Target field 304, Action field 306, Length field 312, and/or Mask field 314 may be required to contain certain values for one or more of the actions to be performed. The additional parameters may identify which actions should be performed, and in what order, if multiple actions are specified by the MemBank field 308, Pointer field 310, and Length field 312. The additional parameters also may prevent the modified SELECT operation from being misinterpreted by one or more of the tags 104a-104n. The additional parameters may further prevent the modified SELECT operation from conflicting with tags that have not been configured to implement the modified SELECT operation.

FIG. 7 is a table that illustrates an example of a modified Select command 700. The values in the MemBank field 702, Pointer field 704, and Length field 706 may specify a memory location in a tag that corresponds with "Action 1" as illustrated in FIG. 6.

An example of an action that may be carried out by one or more of the tags 104a-104n is the modification of the backscatter strength of the tag. Backscatter strength may determine how much a tag changes it's reflection coefficient during modulation. A stronger backscatter may improve the tag's communication link with an interrogator by improving the link's signal-to-noise ratio. Modifying the backscatter strength may correspond with, for example, "Action 1" illustrated in FIG. 6. If the MemBank field 308, Pointer field 310, and Length field 312 of the Select command 300 specify the bit-address "200," then one or more of the tags 104a-104n that have been configured to implement the modified SELECT operation may modify their backscatter strength. For example, the backscatter strength may be increased to a maximum strength allowed by a particular country. Alternatively, the backscatter strength may be modified to a minimum strength that still allows for successful communication with the interrogator.

Another example of an action that may be carried out by one or more of the tags 104a-104n is the adjustment of the tags' response to an ACK command. Adjusting a tag's response may correspond with, for example, "Action 2" illustrated in FIG. 6. If the MemBank field 308, Pointer field 310, and Length field 312 of the Select command 300 specify the bit-address "201," then one or more of the tags 104a-104n that have been configured to implement the modified SELECT operation may adjust their response to the ACK command. Tags typically respond to an ACK command with the tag's EPC number. After receiving the Selectcommand specifying "Action 2 ", one or more of the tags 104a-104n may be configured to respond to the ACK command with the tag's TID number instead of the EPC number. The ACK command may be one of the commands used in an INVENTORY operation. If the INVENTORY operation follows a modified SELECT operation that specifies "Action 2," then the INVENTORY operation may identify tags by TID number instead of EPC number.

Similar examples of actions may configure one or more of the tags 104a-104n to respond to an ACK command with other sets of data, such as, for example, both the EPC and TID numbers, sensor data, and/or data from other memory locations.

Figure 8:
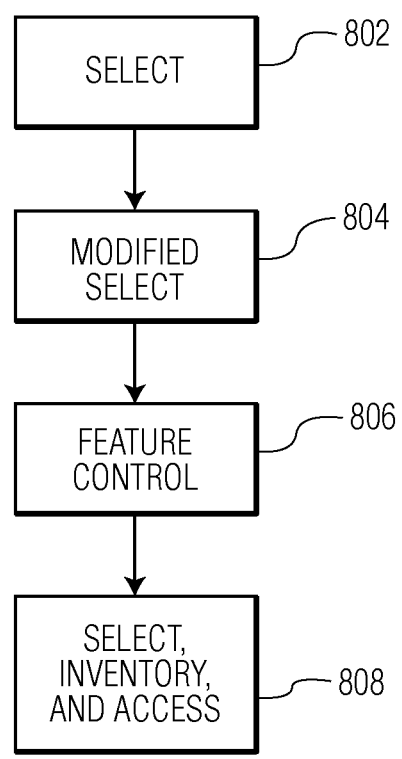
FIG. 8 illustrates an alternate embodiment of a modified sequence of tag management operations.

FIG. 8 illustrates an alternate embodiment of a modified sequence of tag management operations. The modified tag management may begin with a conventional SELECT operation 802. The conventional SELECT operation 802 may select one or more tags 104a-104n in the tag population 104 to participate in the subsequent operations. After the conventional SELECT operation 802, the interrogator 102 may perform a modified SELECT operation 804. Based upon information received in the modified SELECT operation 804, one or more of the tags 104a-104n may control or modify tag features in a Feature Control step 806. After one or more of the tags 104a-104n perform the Feature Control step 806, the interrogator 102 may proceed with conventional SELECT, INVENTORY, and ACCESS operations 808. Alternatively, the interrogator 102 may proceed with one or more additional modified SELECT operations. By performing the conventional SELECT operation 802 prior to the modified SELECT operation, the interrogator may select one or more tags 104a-104n that have been configured to support the modified SELECT operation 804 and Feature Control step 806. In this way, conflicts with tags that may not be configured to support the modified SELECT operation 804 and Feature Control step 806 may be avoided.

It should be apparent from the foregoing description that various exemplary embodiments of the invention may be implemented in hardware and/or firmware. Furthermore, various exemplary embodiments may be implemented as instructions stored on a tangible and non-transitory machine-readable storage medium, which may be read and executed by at least one processor to perform the operations described in detail herein. A tangible and non-transitory machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system for managing a population of RFID tags comprising both modified tags and unmodified tags, comprising:
    an interrogator configured to transmit a select command to the population of RFID tags, wherein the select command includes information specifying a special memory location having specific bit addresses being assigned with respective meanings to specific actions; and
    at least one modified tag in the population of RFID tags, wherein the at least one modified tag comprises a memory configured with a memory address corresponding to the special memory location, and a controller configured to perform at least one action upon the at least one modified tag receiving the select command with the information specifying the special memory location using the assigned meaning to the at least one action corresponding to said memory address, wherein the special memory location does not correspond to an existing memory address.

2. The system of claim 1, wherein the at least one action performed by the controller is configuring the at least one modified tag to modify its backscatter strength.

3. The system of claim 1, wherein the at least one action performed by the controller is configuring the at least one modified tag to modify its reply to an ACK command.

4. The system of claim 1, wherein the select command further includes verification information, and the controller is configured to verify the at least one action with the verification information.

5. A modified RFID tag, comprising:
    an antenna configured to receive a select command from an interrogator, wherein the select command includes information specifying a special memory location having specific bit addresses being assigned with respective meanings to specific actions;
    a memory configured with a memory address corresponding to the special memory location; and
    a controller configured to perform at least one action upon the reception of the select command with the information specifying the special memory location using the assigned meaning to the at least one action corresponding to said memory address, wherein the special memory location does not correspond to an existing memory address.

6. The modified RFID tag of claim 5, wherein the at least one action performed by the controller is configuring the at least one modified tag to modify its backscatter strength.

7. The modified RFID tag of claim 5, wherein the at least one action performed by the controller is configuring the RFID tag to modify its reply to an ACK command.

8. The modified RFID tag of claim 6, wherein the select command further includes verification information, and the controller is configured to verify the at least one action with the verification information.

9. A method for managing a modified RFID tag, comprising:
    receiving a select command from an interrogator, wherein the select command includes information specifying a special memory location having specific bit addresses being assigned with respective meanings to specific actions;
    identifying a memory address of the modified RFID tag that corresponds to the special memory location; and
    performing at least one action upon reception of the select command with information specifying the special memory location using the assigned meaning to at least one action corresponding to said memory address, wherein the special memory location does not correspond to an existing memory address.

10. The method of claim 9, further comprising: configuring the modified RFID tag to modify its backscatter strength.

11. The method of claim 9, further comprising: configuring the modified RFID tag to modify its reply to an ACK command.

12. The method of claim 9, further comprising: configuring the modified RFID tag to verify the at least one action with verification information, wherein the select command further includes the verification information.

13. The method of claim 9, further comprising:
    receiving a pre-select command from the interrogator prior to receiving the select command, wherein the pre-select command includes information instructing the modified RFID tag to receive the select command.

14. A method for managing a population of RFID tags comprising both modified tags and unmodified tags, comprising:
    transmitting a select command to the population of RFID tags, wherein the select command includes information specifying a special memory location having specific bit addresses being assigned with respective meanings to specific actions;
    identifying a memory address of at least one modified tag in the population of RFID tags that corresponds to the special memory location; and
    performing at least one action upon reception of the select command with information specifying the special memory location using the assigned meaning to at least one action corresponding to said memory address, wherein the special memory location does not correspond to an existing memory address.

15. The method of claim 14, further comprising: transmitting a pre-select command to the population of RFID tags prior to transmitting the select command, wherein the pre-select command includes information instructing which modified RFID tags will participate in the select command.

* * * * *